United States Patent [19]
Perona

[11] Patent Number: 5,923,496
[45] Date of Patent: *Jul. 13, 1999

[54] HEAT DIFFUSER FOR MAGNETIC TAPE DRIVE

[75] Inventor: Mark W. Perona, San Diego, Calif.

[73] Assignee: Iomega Corporation, Roy, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,906

[22] Filed: Mar. 12, 1997

Related U.S. Application Data

[63] Continuation of application No. 08/543,127, Oct. 13, 1995, abandoned, which is a continuation-in-part of application No. 08/531,637, Sep. 21, 1995, abandoned.

[51] Int. Cl.[6] .................................................. G11B 5/008
[52] U.S. Cl. ............................................................ 360/96.1
[58] Field of Search ............................. 360/97.01–97.02, 360/96.1, 97.03, 93; 361/687–697

[56] References Cited

U.S. PATENT DOCUMENTS

| | | | |
|---|---|---|---|
| 3,319,861 | 5/1967 | Molina et al. | 226/199 |
| 4,054,931 | 10/1977 | Bolton et al. | 360/97 |
| 4,101,945 | 7/1978 | Butsch | 360/97.02 |
| 4,185,308 | 1/1980 | Fujioka | 360/97 |
| 4,194,225 | 3/1980 | Hasler | 360/97.02 |
| 4,216,512 | 8/1980 | Vidwans | 360/133 |
| 4,280,155 | 7/1981 | Scott et al. | 360/98 |
| 4,292,656 | 9/1981 | Fujioka | 360/97 |
| 4,316,589 | 2/1982 | Stranders | 242/197 |
| 4,339,777 | 7/1982 | Gruczelak | 360/97.02 |
| 4,369,475 | 1/1983 | Ho et al. | 360/97.02 |
| 4,471,395 | 9/1984 | Beck et al. | 360/98 |
| 4,633,349 | 12/1986 | Beck et al. | 360/97.02 |
| 4,789,110 | 12/1988 | Sakaguchi et al. | 242/67.1 R |
| 4,796,120 | 1/1989 | Komatsu et al. | 360/96.5 |
| 4,809,101 | 2/1989 | Tanaka et al. | 360/96.4 |
| 4,838,496 | 6/1989 | Kubota et al. | 242/67.1 R |
| 5,014,141 | 5/1991 | Gervais et al. | 360/96.1 |
| 5,069,415 | 12/1991 | Mechalas | 248/674 |
| 5,149,005 | 9/1992 | Takagi et al. | 242/67.1 R |
| 5,173,819 | 12/1992 | Takahashi et al. | 360/97.03 |
| 5,179,483 | 1/1993 | Lowe | 360/97.02 |
| 5,210,664 | 5/1993 | Perona | 360/93 |
| 5,537,275 | 7/1996 | Peace et al. | 360/106 |

FOREIGN PATENT DOCUMENTS

| | | | |
|---|---|---|---|
| 56-11669 | 2/1981 | Japan | 360/97.02 |
| 63-229683 | 9/1988 | Japan | 360/97.02 |

*Primary Examiner*—Brian E. Miller
*Attorney, Agent, or Firm*—Woodcock Washburn Kurtz Mackiewicz & Norris LLP

[57] ABSTRACT

A magnetic tape drive for reading and writing data on magnetic tape in a cartridge of the type in which a driven roller in the cartridge moves tape past a read/write head in the drive and has a tape drive motor with a fan blade assembly which draws cooling air over the baseplate of the cartridge.

1 Claim, 6 Drawing Sheets

HEAT DIFFUSER FOR MAGNETIC TAPE DRIVE

RELATED APPLICATIONS

This is a continuation of application Ser. No. 08/543,127, filed Oct. 13, 1995 now abandoned which is a continuation-in-part of Ser. No. 08/531,637 filed Sep. 21, 1995 now abandoned.

This application is a continuation-in-part of copending U.S. application Ser. No. 08/531,637 filed Sep. 21, 1995 entitled "Heat Diffuser for Magnetic Tape Drive" by Mark W. Perona.

This application is related to applications SNAP-IN CHASSIS TAPE DRIVE, Perona, Ser. No. 08/543,133, filed Oct. 13, 1995; OPENING LEVER FOR MAGNETIC TAPE CARTRIDGE DOOR, Perona, Ser. No. 08/543,134, filed Oct. 13, 1995, and CLIP FOR ATTACHING TAPE DRIVE MOTOR TO CHASSIS, Perona, Ser. No. 08/543,128, filed Oct. 13, 1995, which are incorporated herein by reference.

BACKGROUND OF THE INVENTION

This invention relates to a magnetic tape drive and more particularly, to a diffuser for removing heat from a tape drive.

U.S. Pat. No. 5,210,664-Perona shows a tape drive for use with so-called "Mini-Data" cartridges. There are standards for these drives so that drives manufactured by different companies can read and write data interchangeably. These standards are referred to as the "QIC" (Quarter-Inch Cartridges) standards. One set of standards is referred to as the "QIC-80 Standards for 250–800 megabyte products." Recently, a new wide tape cartridge referred to as "TRA-VAN" has been announced for use with such drives. The Travan cartridge has a metal base plate which is a reference for all cartridge/drive interface specifications. It is important to minimize thermal variations in the cartridge. The Traban cartridge has increased data capacity so this cartridge may be in the drive for extended periods of time making thermal gradient control more difficult.

These drives are typically mounted in a cabinet and rack containing a personal computer and peripherals. In such use, the dissipation of heat from the cartridge and the tape drive is a particular problem.

U.S. Pat. No. 5,014,141-Gervais is typical of prior art heat dissipation in magnetic tape drives. This patent shows a tape drive having a cooling blower for circulating cooling air within air ducts in the tape drive. Prior commercially available tape drives have air circulated by fans driven by the tape drive motor. These include the Cipher DC 3000 XL drive and Model 06-31-004-01 drive made by Mountain/Summit.

It is an object of the present invention to provide improved heat dissipation in a magnetic tape cartridge and drive.

SUMMARY OF THE INVENTION

In a magnetic tape drive of the type in which a driven roller in the cartridge moves tape past a read/write head, the tape drive motor has a fan blade assembly which circulates cooling air. The air flows past the baseplate of the cartridge to minimize thermal gradients which might otherwise cause changes in the critical dimensions of the cartridge. The metal baseplate is a convenient way to remove heat from the cartridge.

The tape drive motor has a drive shaft for a drive roller which engages the driven roller in the cartridge. The motor is mounted under a chassis with the fan assembly beneath the chassis. The cartridge is inserted over the chassis. Cooling air flows beneath the cartridge baseplate to cool the cartridge. The air is drawn by the blade assembly under the chassis and out through the rear of the pan in which the chassis is mounted.

The foregoing and other objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
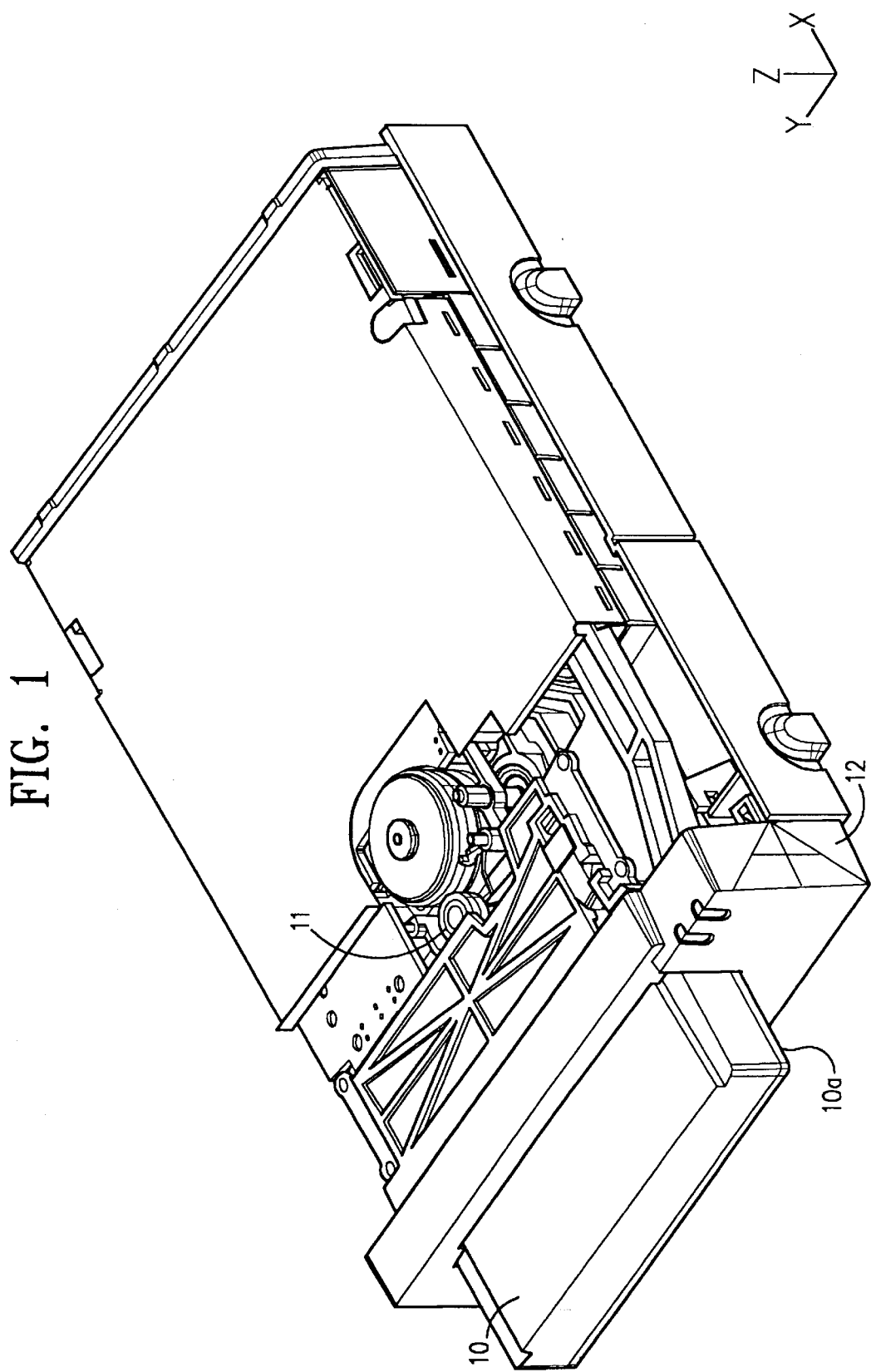
FIG. 1 is a perspective view of the tape drive of the present invention with a cartridge.

Tape drives of this type are for use with cartridges 10 having a metal baseplate 10a. The drive includes a drive roller 11 which engages a driven roller in the cartridge to move magnetic tape in the cartridge. The tape is read by a magnetic head 13 in the drive.

The drive roller 11 is driven by a motor 14 which has a drive shaft 15.

Figure 2:
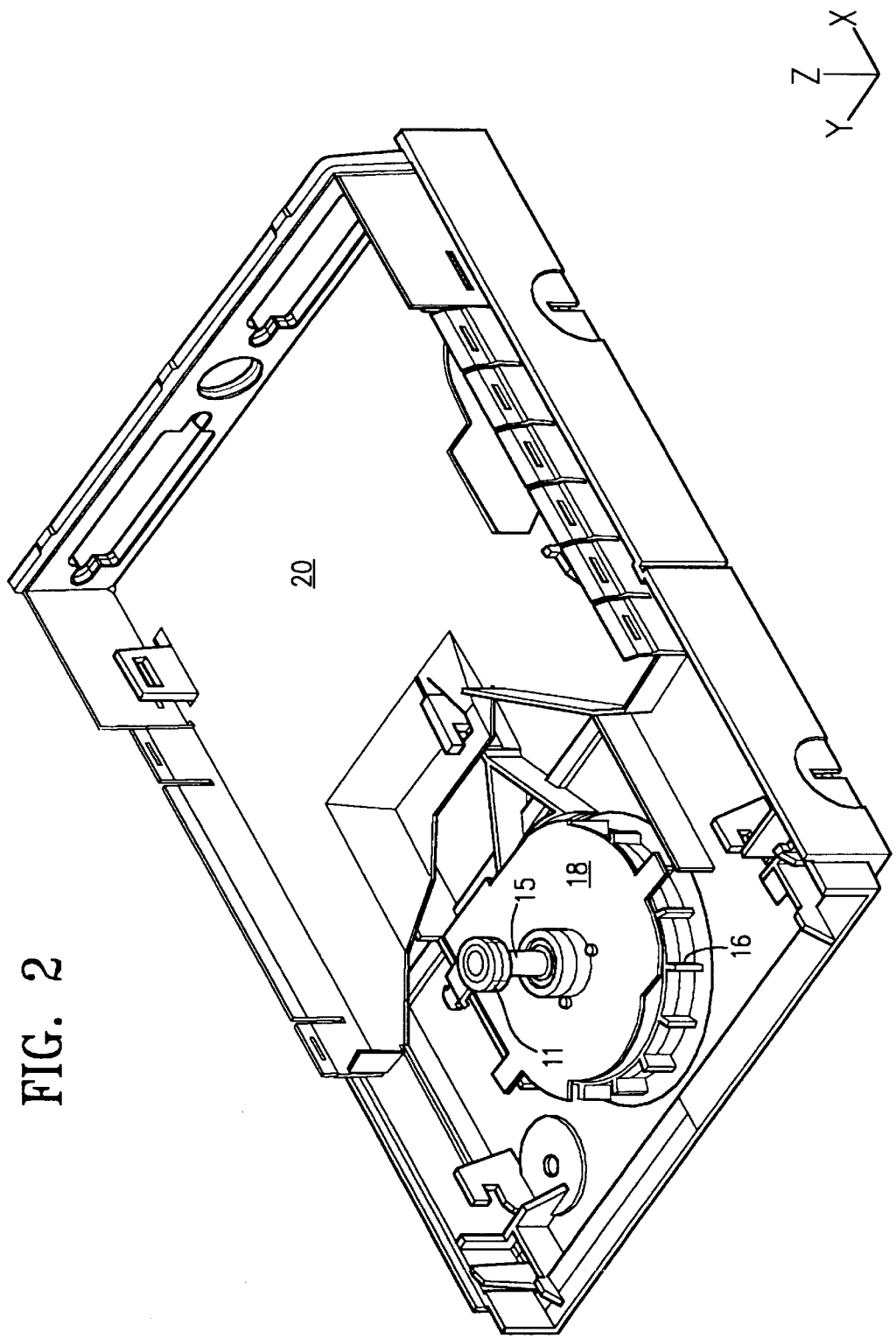
FIG. 2 is a perspective view partially broken away.
Figure 3:
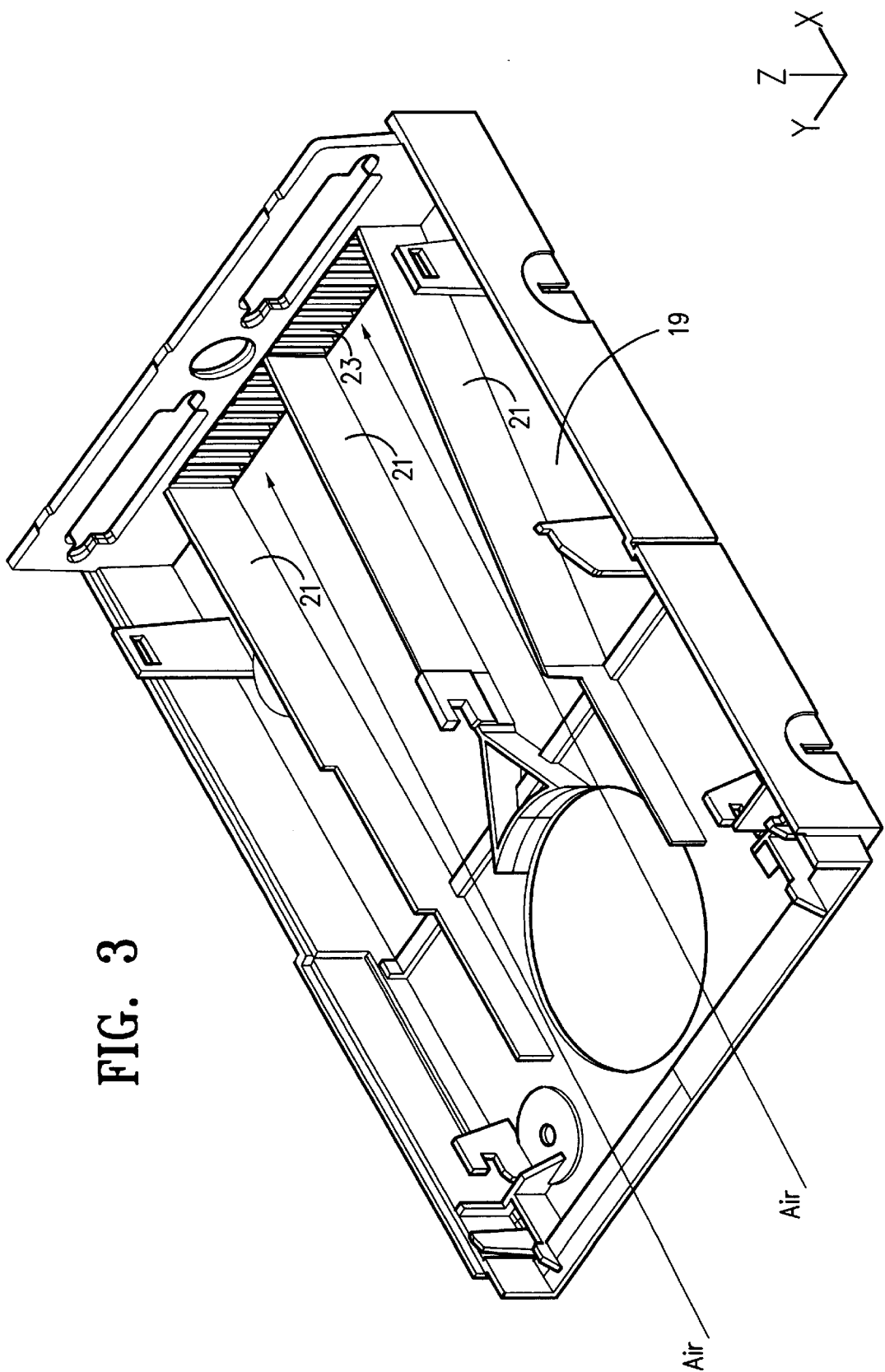
FIG. 3 is similar to FIG. 2, but with the sheet metal cover removed.
Figure 4:
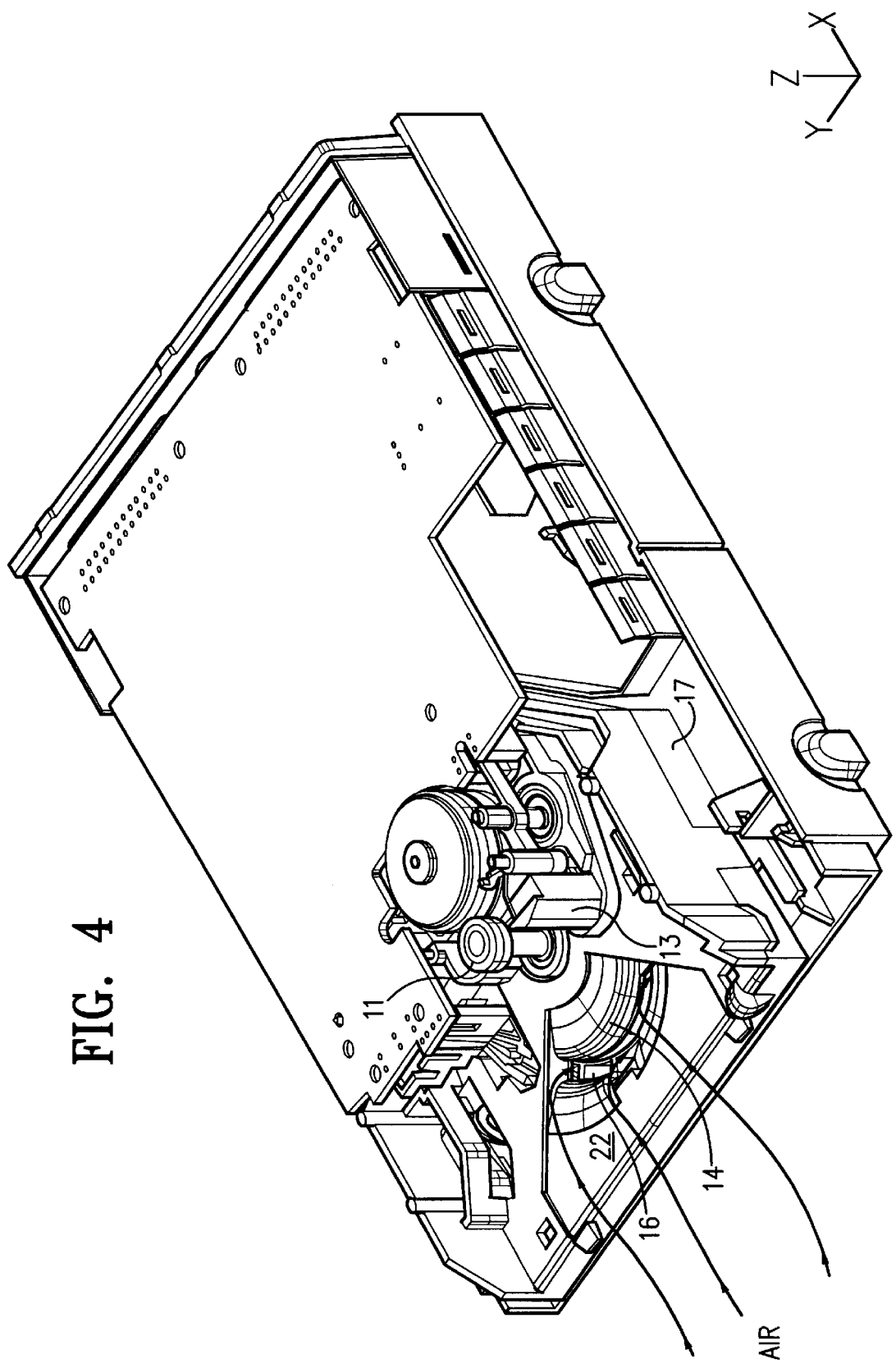
FIG. 4 is similar to FIGS. 2 and 3, but showing different portions broken away.
Figure 5:
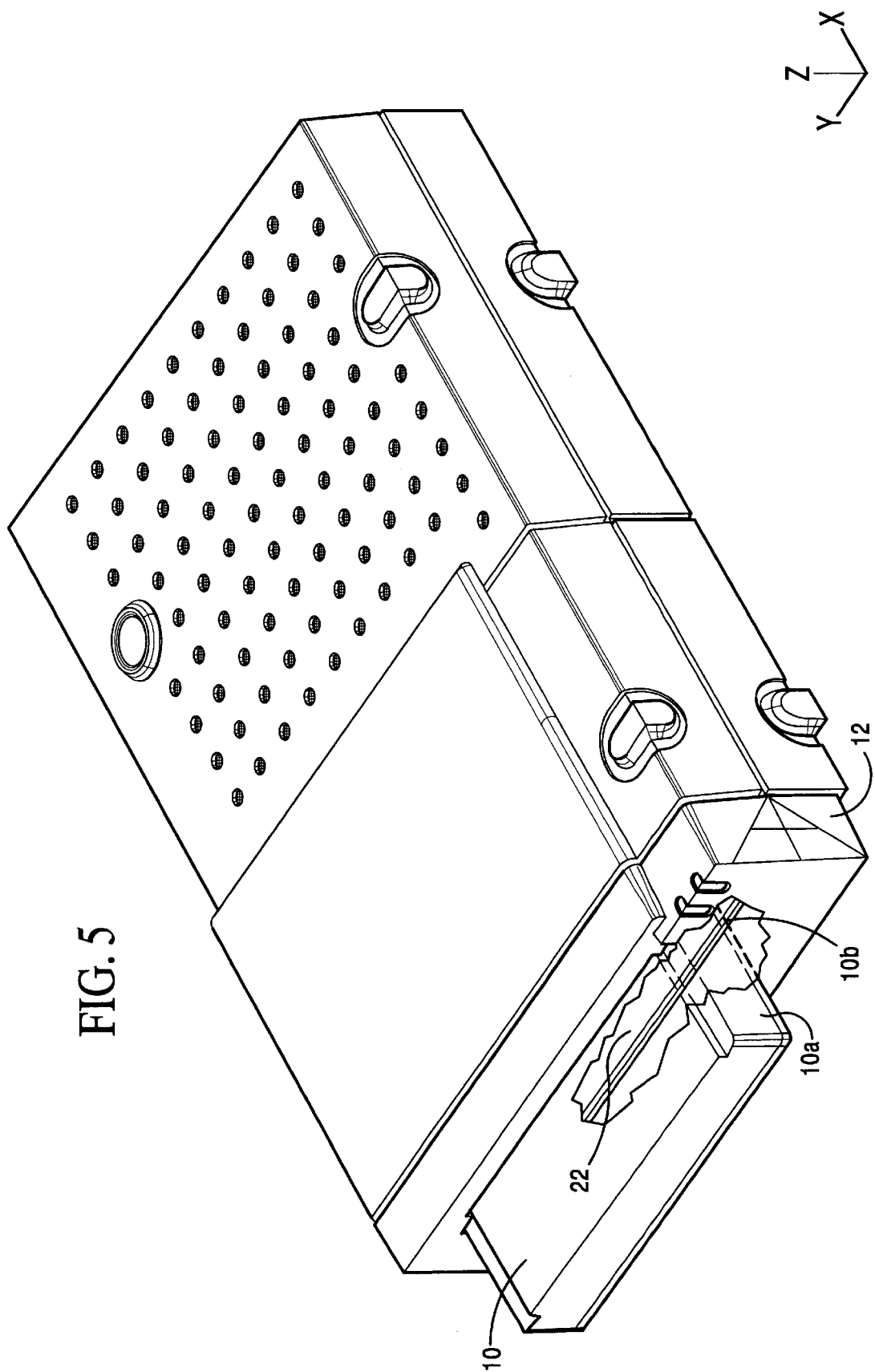
FIG. 5 is similar to FIG. 4 and shows a cartridge being inserted into the drive and FIG. 6 is an exploded perspective view of the bottom of the chassis.
Figure 6:
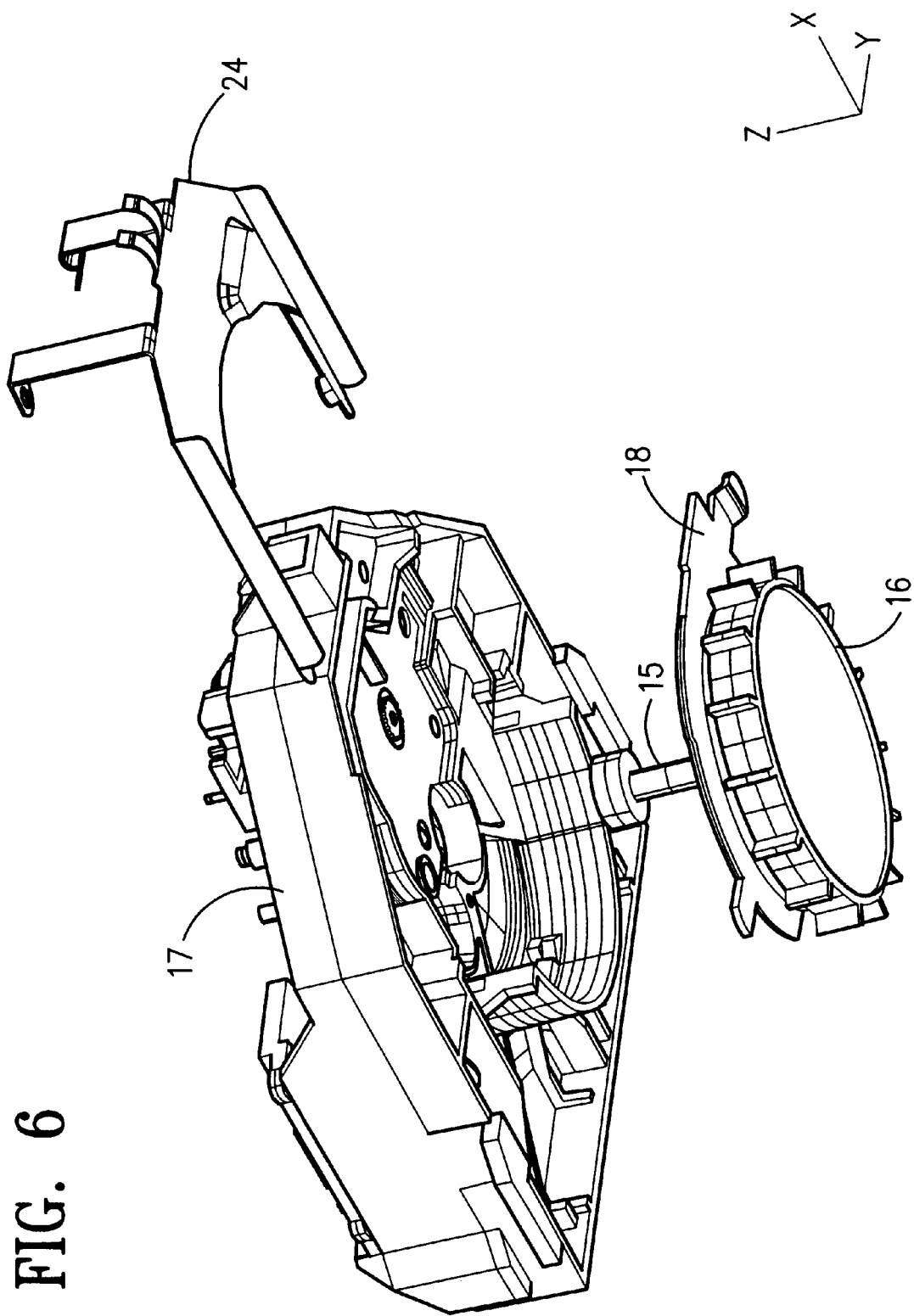

In accordance with the invention, a fan assembly including blades 16 is rotated by drive shaft 15. The fan assembly circulate air beneath the molded, one-piece chassis 17. The motor 14 is mounted beneath the chassis 17 with the fan assembly 16 also beneath the chassis. Motor 14 is mounted to the chassis 17 by a spring retainer clip 24 over motor plate 18 (FIGS. 2, 3 and 6). The chassis 17 is snapped into the pan 19. Sheet metal 20 rests on the ribs 21 (FIG. 3) in the pan 19.

The air enters the bezel 12 in the front of the drive, it flows over the front portion 22 of chassis 17. This air flow is directed across baseplate 10a of cartridge 10. This cools cartridge 10 at its interface 10b with front portion 22 of chassis 17. Fan assembly 16 draws air down beneath chassis 17. The air exits through the vent holes 23 in the rear of pan 19. In this way, cooling air circulates through the area directly beneath cartridge baseplate 10a. Using the motor 14 to circulate air saves the costs of having a separate fan and motor. Drawing air over the baseplate 10a of the cartridge cools the cartridge efficiently and helps minimize changes in critical dimensions otherwise caused by thermal gradients.

Various modifications may be made to the preferred embodiment. The appended claims are, therefore, intended to cover all such modifications within the true spirit and scope of the invention.

What is claimed is:

1. A magnetic tape drive for reading/writing data on magnetic tape in a cartridge of the type in which a driven roller in said cartridge moves tape past a read/write head in said drive, said cartridge having a baseplate which is a reference for the interface between said cartridge and said drive and an opening in said cartridge through which said driven roller is driven, said drive comprising:

a motor having a drive shaft, a drive roller driven by said drive shaft of said motor;

a bezel having a front opening into which said cartridge is inserted;

a magnetic head;

a chassis, said motor, drive roller and magnetic head being mounted on said chassis, a front portion of said chassis at the bottom of said front opening, said cartridge being inserted into said front opening with said baseplate in contact with said front portion, the front portion of said chassis and the baseplate of said cartridge forming said interface between said cartridge and said drive;

means providing engagement between said drive roller and said driven roller through said opening in said cartridge when said cartridge is inserted into said drive to move said tape past said read/write head;

a pan, said chassis being mounted to said pan, said pan having openings in the rear thereof, a fan blade assembly mounted on said drive shaft and rotated by said motor to circulate cooling air past said cartridge, said motor and fan blade assembly being mounted beneath said chassis, said fan blade assembly drawing air through said front opening, over said front portion of said chassis beneath said chassis, said air being exhausted through said openings in the rear of said pan so that said air flows past said front portion of said chassis and past said baseplate of said cartridge to minimize thermal variations at said interface.

* * * * *